(12) United States Patent  
Tofte

(10) Patent No.: US 9,002,719 B2  
(45) Date of Patent: Apr. 7, 2015

(54) DEVICE AND METHOD FOR BUILDING CLAIM ASSESSMENT

(71) Applicant: State Farm Mutual Automobile Insurance Company, Bloomington, IL (US)

(72) Inventor: Nathan Lee Tofte, Downs, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 13/647,098

(22) Filed: Oct. 8, 2012

(65) Prior Publication Data

US 2014/0100889 A1    Apr. 10, 2014

(51) Int. Cl.
G06Q 40/00    (2012.01)
G06Q 40/08    (2012.01)

(52) U.S. Cl.
CPC ..................................... *G06Q 40/08* (2013.01)

(58) Field of Classification Search
USPC ............. 705/4, 2, 3, 39, 40, 38, 41; 701/32.2; 702/151; 345/420; 367/116; 382/190, 382/286, 124, 209
See application file for complete search history.

(56) References Cited

U.S. PATENT DOCUMENTS

| | | | |
|---|---|---|---|
| 5,950,169 A * | 9/1999 | Borghesi et al. ................... 705/4 |
| 7,343,307 B1 * | 3/2008 | Childress .......................... 705/4 |
| 7,809,587 B2 * | 10/2010 | Dorai et al. ....................... 705/4 |
| 7,889,931 B2 * | 2/2011 | Webb et al. .................... 382/209 |
| 7,953,615 B2 * | 5/2011 | Aquila et al. ..................... 705/4 |
| 7,984,500 B1 * | 7/2011 | Khanna et al. .................. 726/22 |
| 8,265,963 B1 * | 9/2012 | Hanson et al. .................... 705/4 |
| 8,374,957 B1 * | 2/2013 | Garcia et al. .................... 705/39 |
| 8,401,879 B1 * | 3/2013 | Kazenas .......................... 705/4 |
| 8,510,196 B1 * | 8/2013 | Brandmaier et al. ........... 705/35 |
| 8,527,305 B1 * | 9/2013 | Hanson et al. .................... 705/4 |
| 8,537,338 B1 * | 9/2013 | Medasani et al. ........... 356/4.01 |
| 8,543,486 B2 * | 9/2013 | Donoho et al. ................. 705/37 |
| 8,651,206 B2 | 2/2014 | Slawinski et al. |
| 2002/0035488 A1 * | 3/2002 | Aquila et al. ..................... 705/4 |
| 2002/0055861 A1 * | 5/2002 | King et al. ........................ 705/4 |
| 2003/0067461 A1 * | 4/2003 | Fletcher et al. ............... 345/420 |
| 2003/0154111 A1 * | 8/2003 | Dutra et al. ....................... 705/4 |
| 2003/0200123 A1 * | 10/2003 | Burge et al. ....................... 705/4 |
| 2004/0030587 A1 * | 2/2004 | Danico et al. ..................... 705/4 |
| 2005/0108065 A1 * | 5/2005 | Dorfstatter ........................ 705/4 |
| 2005/0276401 A1 * | 12/2005 | Madill et al. ............. 379/114.14 |
| 2006/0031103 A1 * | 2/2006 | Henry ............................... 705/4 |
| 2007/0179868 A1 * | 8/2007 | Bozym .......................... 705/27 |

(Continued)

OTHER PUBLICATIONS

Cost Containment, Product and Solutions for the Property and Casualty Insurance Industry, Computer Sciences Corporation, 1999.*

(Continued)

*Primary Examiner* — Tien Nguyen
(74) *Attorney, Agent, or Firm* — Marshall, Gerstein & Borun LLP; Randall G. Rueth

(57) ABSTRACT

Disclosed systems and methods automatically assess claims. A device may receive one or more images of a claimed object, such as a building or vehicle, compare the images to reference images and generate an estimate of financial damages to the object. The device may then generate a claim assessment based on previous comparisons and generated estimates. The claim assessment may be sent directly to a client or to an agent for review and/or processing.

18 Claims, 2 Drawing Sheets

(56) References Cited

U.S. PATENT DOCUMENTS

| | | | |
|---|---|---|---|
| 2008/0255887 A1* | 10/2008 | Gruter | 705/4 |
| 2009/0028003 A1* | 1/2009 | Behm et al. | 367/116 |
| 2009/0055226 A1* | 2/2009 | Tritz et al. | 705/4 |
| 2009/0119132 A1* | 5/2009 | Bolano et al. | 705/4 |
| 2009/0138290 A1* | 5/2009 | Holden | 705/4 |
| 2009/0265193 A1* | 10/2009 | Collins et al. | 705/4 |
| 2010/0094664 A1* | 4/2010 | Bush et al. | 705/4 |
| 2010/0104191 A1* | 4/2010 | McGwire | 382/190 |
| 2011/0302091 A1* | 12/2011 | Hornedo | 705/305 |
| 2012/0013617 A1* | 1/2012 | Zhang et al. | 345/420 |
| 2012/0076437 A1* | 3/2012 | King | 382/286 |
| 2013/0051637 A1* | 2/2013 | Kulcke et al. | 382/124 |
| 2013/0051639 A1 | 2/2013 | Woodford et al. | |
| 2013/0262153 A1 | 10/2013 | Collins et al. | |
| 2013/0321393 A1 | 12/2013 | Winder | |

OTHER PUBLICATIONS

U.S. Appl. No. 13/804,984, filed Mar. 14, 2013.
U.S. Appl. No. 13/836,695, filed Mar. 15, 2013.
U.S. Appl. No. 13/839,634, filed Mar. 15, 2013.
U.S. Appl. No. 13/893,904, filed May 14, 2013.
UTC Spotlight: Superstorm Sandy LiDAR Damage Assessment to Change Disaster Recovery, Feb. 2013.
U.S. Appl. No. 14/047,873, filed Oct. 7, 2013.
Woodbeck et al., "Visual cortext on the GPU: Biologically inspired classifier and feature descriptor for rapid recognition," IEEE Computer Society Conference on Computer Vision and Pattern Recognition Workshops 2008, pp. 1-8 (2008).

* cited by examiner

DEVICE AND METHOD FOR BUILDING CLAIM ASSESSMENT

FIELD OF THE DISCLOSURE

This disclosure relates to claim assessments, and in particular, to automated building claim assessments.

BACKGROUND

After an accident or loss, property owners typically file claims with their insurance companies. In response to these claims, the insurance companies assign an agent to investigate the claims to determine the extent of damage and/or loss and to provide their clients with appropriate compensation.

Often, the claim investigations can be time-consuming, difficult and even dangerous for the insurance agents. For example, in order to investigate a claim for damage to a home owner's roof, an agent may have to climb onto the roof, and perform inspections while on the owner's roof. By climbing on the roof and attempting to maneuver around the roof to perform his inspection, the insurance agent opens himself to a real risk of injury, especially in difficult weather conditions where the roof may be slippery because of rain, snow, and/or ice and winds may be severe.

Even if the insurance agent performs the inspection without getting injured, performing the full investigation may still be time-consuming. In addition to the time required to drive to and from the incident site and to perform the inspection itself, significant paperwork and calculations may be involved in calculating compensation owed to the clients. For example, if an insurance agent takes photos on the roof of a client's building to assess a claim for roof damage from a hurricane, in order to calculate how much money should be paid to the client, the agent may have to come back to his office, research the client's property, research the cost of the damaged property and research repair costs. All of these steps are time consuming and both delay payment to the client and prevent the agent from assessing other client claims.

In situations where the insurance company has received a large number of claims in a short time period (e.g., when a town is affected by a hurricane, tornado, or other natural disaster), an insurance agent may not have time to perform a timely claim investigations of all the received claims. If claim investigations are not performed quickly, property owners may not receive recovery for their losses for long periods of time. Additionally, long time delays when performing claim investigations can lead to inaccurate investigations results (e.g., the delay may lead to increased opportunity for fraud and/or may make it more difficult to ascertain the extent of damage at the time of the accident or loss).

SUMMARY

A device for performing building claim assessment includes a controllable inspection vehicle; a processing unit; a memory unit; and a claim assessment module. The claim assessment module receives at least one image of a structure. The claim assessment module then compares the received image or images to at least one reference image in an image database. The claim assessment module then performs a damage calculation based at least in part on the image comparison. Using the results of the damage calculation, the claim assessment module may then generate a financial damage estimate and a final claim assessment. The final claim assessment can then be sent to an insurance agent or a client.

A tangible non-transitory computer-readable medium has instructions stored thereon that, when executed by a processor, cause the processor to capture at least one image of a structure. The processor then compares at least a portion of the captured image or images to at least one similar image in an image database. After comparing the captured image or images, the processor then performs a damage calculation based at least in part on the image comparison. Using the results of the damage calculation, the processor may then generate a financial damage estimate and a final claim assessment. The processor can then send the final claim assessment to an insurance agent or a client.

A method in a computing device having a processor includes using the processor to receive at least one image of a structure. In the method, the processor is also used to compare the received image to at least one reference image in an image database. As part of the method, the processor also performs a damage calculation based at least in part on the image comparison. Using the results of the damage calculation, the processor may then generate a financial damage estimate and a final claim assessment. The processor can then send the final claim assessment to an insurance agent or a client.

DETAILED DESCRIPTION

Figure 1:
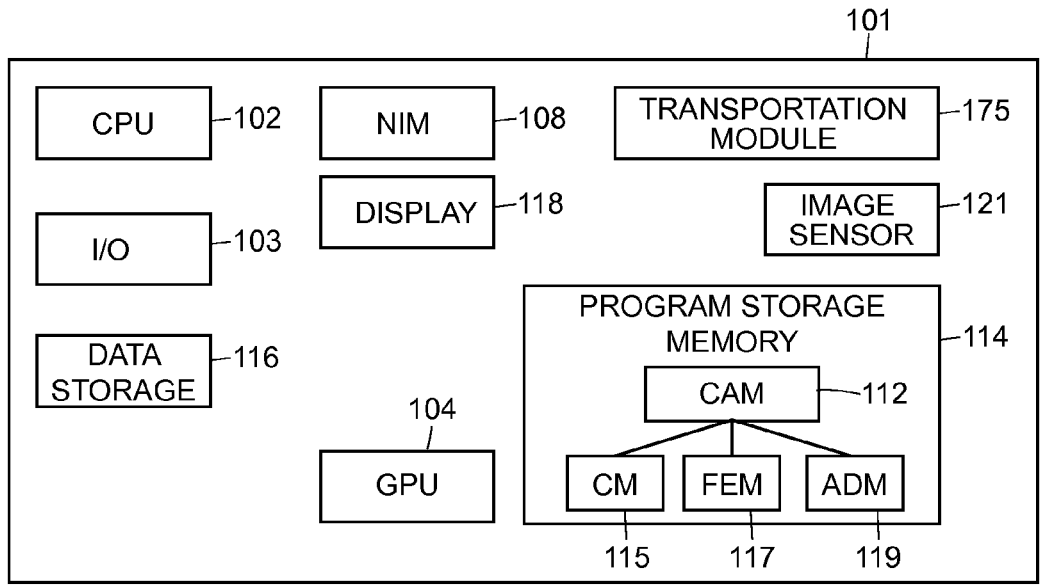
FIG. 1 depicts a block diagram of an exemplary device configured to perform claim assessment according to the present disclosure.

A system and method allow a user to automatically assess a claim. The system and method may be self-contained (i.e., the system and method may not require any outside intervention after the claim is automatically assessed) or may require further outside involvement (e.g., an insurance agent may be required to approve an automatically assessed claim and/or the insurance agent may control the transportation of an inspection vehicle).

Generally, the described system and method may be used to automatically assess one or more insurance claims for property loss and/or damage. An insurance agent may receive an insurance claim from a client. The claim, for example, may be for damage to the client's home. The agent may then travel to the location of the damaged property and activate an claim assessment device onsite, or he may activate the claim assessment device remotely and provide the device with the location of the damaged property. The claim assessment device may then travel to the provided location autonomously or under the human control (e.g., the insurance agent may control the device remotely to instruct the device on where to travel).

After the assessment device is at the claim site (i.e., the location of the damaged/destroyed property), the assessment device may then capture one or more images of the property. The device may include one or more image sensors (e.g., cameras) configured to capture these images. The claim assessment device may be capable of autonomously traveling around the claim site (e.g., via ground and/or air) in order to fully capture the extent of property damage/destruction or may travel based on user commands (e.g., based on instructions from an RF controller operated by an insurance agent). The images may be stored locally on the assessment device and/or sent to another device (e.g., a computer server) for remote storage.

The claim assessment device may contain a comparison module that then compares the captured image or images to at least one similar image in an image database. The image database may be stored locally or remotely and may contain images of property and materials similar to those that were damaged or destroyed. For example, for a claim related to a home owner's wind-damaged roof, the comparison module may compare captured images of the roof to images of an intact roof and/or of intact individual roof tiles. More specifically, the comparison module may compare a captured image of the damaged roof to the image of the intact roof, and based on the comparison, may calculate the relative amount of damage. For example, damage may be confined to only the upper right corner or center of the roof. Alternatively, the entire roof may be damaged, or damage may be limited to only a few roof tiles. Based on the comparisons and the relative amount of damage, the comparison module may calculate the appropriate remedy. For example, if damage is concentrated in a small area of a roof, only that portion of the roof may need to be replaced. Alternatively, if the entire roof is damaged or damage is spread across the roof, the entire roof may need to be replaced.

The comparison module may interact with a financial estimate module. The financial estimate module may be used to evaluate calculations by the comparison module and calculate financial damages accordingly. More specifically, the financial estimate module may evaluate the remedy calculated by the comparison module (e.g., replace only a section of a roof, replace the entire roof, replace only a few roof tiles, etc.) and calculate the financial cost of the remedy. The financial estimate module may refer to a financial database that may be stored locally or remotely and may contain pricing estimates of property and materials similar to those that were damaged or destroyed. The financial database may also include labor costs that may be used by the financial estimate module when calculating financial damages. If more than one repair option is available (e.g., it would be possible to either replace the entire roof or replace only a section of the roof, depending on client preferences), the financial estimate module may calculate the financial cost for both options.

After the financial estimate module has calculated the financial cost or costs of repairs, an assessment decision module may generate a claim assessment evaluation that may be sent to the client and/or the insurance agent. The claim assessment evaluation may be conditional on a subsequent investigation of the claim (e.g., to verify that the user was not responsible for the damage or destruction to his property). Alternatively, the claim assessment evaluation may be "pre-approved," so that no further action is required by the insurance company or the insurance agent in order for the evaluation to be finalized. In some instances, the client may not qualify for recovery from the insurance company (e.g., based on the analysis by the assessment, there was no damage to the client's property or the damage was so minimal as to not qualify for recovery). In such cases, the assessment device or another device may notify the user that he is not eligible for recovery on his claim.

The described methods can be implemented in a claim assessment module operating in an autonomous or user-controlled computing device, for example. More generally, the claim assessment resolution module may operate in any suitable system having a processor capable of capturing and analyzing images in response to an assessment request (e.g., an insurance client's claim). Optionally, the claim assessment resolution module may operate on the processor itself. The claim assessment resolution module may capture one or more images of a property or a geographical area, compare the image or images to one or more images stored in an image database, and perform a damage calculation based on the image comparison. The claim assessment resolution module may also determine the appropriate remedy in response to the calculated damage. After performing the damage and remedy calculations, the claim assessment resolution module may evaluate the remedy and calculate its financial cost. Finally, after calculating the financial cost or costs, the assessment decision module may generate a claim assessment evaluation that may be sent to the client and/or an insurance agent.

Generally speaking, the techniques of the present disclosure can be applied to assess one or more individual insurance claims for property loss and/or damage (e.g., roof damage after severe weather, car damage after an accident, etc.) but may be used in other contexts (e.g., surveying a geographical area), or in conjunction with more traditional techniques for assessing insurance claims.

FIG. 1 depicts a block diagram of an exemplary device 101 for performing automated claim assessment according to the present disclosure. The exemplary device 101 may be a portable device such as a smartphone, a personal digital assistant (PDA), a tablet personal computer (PC), a laptop computer, a handheld game console, etc., or a non-portable computing device such as a desktop computer or, in some implementations, a server. The device 101 may include one or more processors, such as a central processing unit (CPU) 102, to execute software instructions. The device 101 may also include an input/output (I/O) unit 103 and one or more image sensors 121 (e.g., cameras). The software instructions may be stored on a program storage memory 114, which may be a hard drive, an optical drive, a solid state memory device, or any other non-volatile memory device. The software instructions may retrieve data from a data storage 116, which may likewise be any non-volatile data storage device, including one or more databases 150 that are part of or external to the device 101. During execution, the software instructions may be stored in, and may store and retrieve data from, a volatile or non-volatile memory source, such as a random access memory (RAM) 106.

The device 101 may include a network interface module (NIM) 108 for wired and/or wireless communications. The network interface module 108 may allow the device to communicate with one or more other devices (not shown) using one or more of any number of communications protocols including, by way of example and not limitation, Ethernet, cellular telephony, IEEE 802.11 (i.e., "Wi-Fi"), Fibre Channel, etc. The network interface module 108 may communicatively couple the device 101 to servers and/or client devices.

The device 101 may include an autonomous transportation module 175 that allows for travel around a geographic area (e.g., a claim inspection site). The transportation module 175 may be part of a controllable inspection vehicle and may include, for example, land, air, and/or water travel components (e.g., wheels, blades, wings, motors, etc.). In certain implementations, the device 101 may be programmed to travel to a specified location (e.g., a claim site) from a distant location (e.g., an insurance agent's office) and to survey the site for assessment purposes. Alternatively, a user (e.g., an insurance agent) may be able to control the travel of the device (via the inspection vehicle) remotely (e.g., through the use of an RF controller).

The program storage memory 114 may store a claim assessment module (CAM) 112 executed by the CPU 102 to perform automatic claim assessment. The claim assessment module 112 may be a sub-routine of a software application or may be an independent software routine in and of itself. Alternatively, in some implementations, claim assessment module 112 may be a hardware module or a firmware module. The claim assessment module 112 may include compiled instructions directly executable by the CPU 102, scripted instructions that are interpreted at runtime, or both. The device 101 may also include a graphics processing unit (GPU) 104 dedicated to rendering images to be displayed on a display 118. The claim assessment module 112 may contain one or more of comparison module (CM) 115, financial estimate module (FEM) 117, and/or assessment decision module (ADM) 119.

The claim assessment module 112 may assess insurance or other financial claims according to the presently described techniques. More specifically, the claim assessment module 112 may automatically assess insurance or other financial claims based on stored and received images of one or more allegedly damaged structures. The images may be captured, for example, by sensor 121 and stored in program storage memory 114 and/or RAM 106. The claim assessment module 112 may process claim assessment data in response to data received at a device and/or stored on the receiving device or another device. In instances where the claim assessment module 112 executes on a server device, the calculated assessment and/or intermediate assessment results may be sent to a client device. Additionally, the claim assessment module 112 may perform certain calculations on a server device while other calculations are performed on a client device or another intermediate device. For example, the claim assessment module 112 may perform image comparisons on a server device but may perform financial calculations on a client device.

Figure 2:
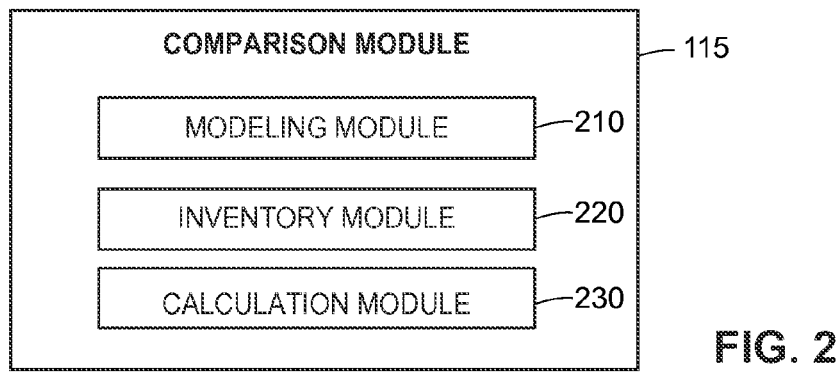
FIG. 2 depicts a comparison module according to the present disclosure.

FIG. 2 is a block diagram detailing an exemplary embodiment of the comparison module 115 according to the present disclosure. The comparison module 115 may include a modeling module 210, an inventory module 220, and a calculation module 230. The modeling module 210, inventory module 220, and calculation module 230 may be separate modules or may be combined and may interact with each other and/or with other software, hardware, and/or firmware.

Execution of claim assessment module 112 may cause the processor 102 to request and/or receive, via the I/O unit 103 and/or a network connection, one or more images of allegedly damaged structures. After the image or images have been received, for example, via the I/O unit 103, claim assessment module 112 may generate a model of the allegedly damaged or destroyed structure based on the image or images. The model may be either 2 or 3-dimensional. More specifically, claim assessment module 112 may use or access modeling module 210 to take the received image or images and generate a model of the allegedly damaged structure based on the image or images. The model may be created at a predefined level of detail (e.g., accurate to within ten percent) and/or may be adjustable (e.g., a user or computer processor may be able to "zoom in" or "zoom out" of the model). Modeling module 210 may also generate more than one model of the same structure based on the received image or images. For example, on a claim for a damaged roof, modeling module 210 may generate one model of the entire roof and another model of an individual roof tile.

After modeling module 210 generates the one or more structure models based on the received image or images, claim assessment module 112 may use inventory module 220 to compare the structure model or models with one or more predefined structure models. Similarly, claim assessment module 112 may use inventory module 220 to compare the previously received image or images with one or more predefined images. The predefined images may, for example, be stored locally or remotely on a database such as database 150. On a claim for a damaged roof, for example, inventory module 220 may compare generated and/or stored models and/or images of the damaged roof and of individual tiles with previously stored images of "stock" replacement tiles and of an intact roof. Inventory module 220 may also determine the best available replacement parts to replace out of stock or outdated components. For example, if the tiles on a damaged roof are old and no longer available for purchase because the tile manufacturer has gone out of business, inventory module 220 may be able to compare images of the damaged tiles to images of available replacement tiles and to determine the best available replacement tiles accordingly.

Based on the calculations of modeling module 210 and inventory module 220, calculation module 230 may determine the extent of the damage on the claimed structure and what supplies will be needed to make the necessary repairs. For example, if a model generated by modeling module 210 indicates that an entire rooftop is damaged, calculation module 230 may determine that the entire rooftop needs to be replaced, and based on the available replacement components determined by inventory module 220, calculation module 230 may determine the number of tiles required. Similarly, based on a generated model or models, calculation module 230 may determine that only a few individual components may need to be replaced or that only a certain section or sections of the damaged structure need to be replaced. If more than one suitable replacement option is available (e.g., the originally used tiles on a damaged roof are no longer available and two different types of tiles are equally appropriate to replace missing or broken tiles on a damaged roof), calculation module 230 may perform calculations for each of the replacement options.

Figure 3:
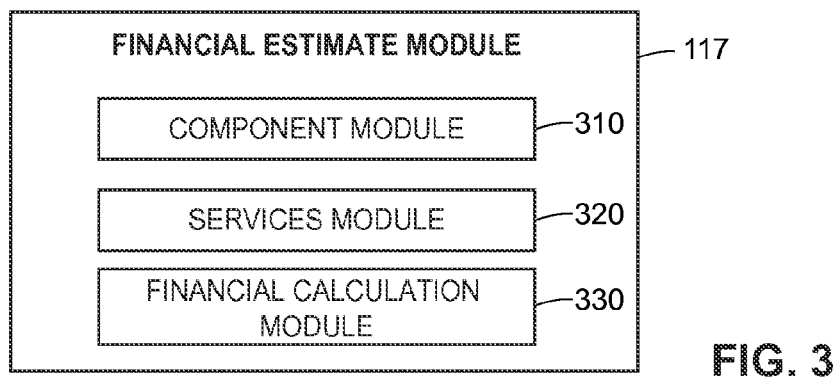
FIG. 3 depicts a financial estimate module according to the present disclosure.

FIG. 3 is a block diagram detailing an exemplary embodiment of the financial estimate module 117 according to the present disclosure. The financial estimate module 117 may include a component module 310, a services module 320, and a calculation module 330. Component module 310, services module 320, and calculation module 330 may be separate modules or may be combined and may interact with each other and/or with other software, hardware, and/or firmware.

The processor 102 may use financial estimate module 117 to estimate financial costs during the evaluation of a claim. More specifically, financial estimate module 117 may use the analysis of comparison module 115 to estimate the cost of any necessary repairs and to generate an initial financial estimate to be included in the final claim assessment. Component costs (e.g., the cost of roof tiles, nails, glue, siding, wood, sheet metal, etc.) may be calculated by component module 310, and geographically appropriate labor costs (e.g., hourly worker rates, insurance costs, overhead costs, etc.) may be calculated by services module 320. Further, calculation module 330 may generate an initial financial estimate to be included in the final claim assessment. The initial financial estimate may be based on calculation results from component module 310 and/or services module 320. Financial estimate module 117 may refer to pricing data stored within the module itself (e.g., sample component prices may be stored in component module 310 and typical labor prices may be stored in services module 320) or in one or more databases such as database 150, which may be stored locally on device 101 or on a remote device.

When calculating component costs, component module 310 may use component prices for each of the necessary supplies to determine a total supply estimate. If appropriate, component module 310 may incorporate bulk purchasing discounts and/or any other appropriate price adjustments. Additionally, if more than one set of supplies would be appropriate for repairs (e.g., two different types of roofing tiles would both be equally effective in repairing any sustained damages), component module 310 may perform pricing calculations for each set of supplies.

When calculating labor costs, services module 320 may refer to a listing of labor costs for each of the necessary services to determine a total labor cost estimate. If appropriate, services module 320 may incorporate applicable discounts or surcharges (e.g., bulk discount rates offered by a contractor for agreeing to multiple service contracts, extra charges for worker overtime, etc.). Additionally, if more than one type of repair would be equally appropriate (e.g., if replacing aluminum siding with new siding or replacing the aluminum siding with brick would both be equally effective in repairing any sustained damages), services module 320 may performing pricing calculations for each type of repair.

Based on calculations performed by component module 310 and/or services module 320, calculation module 330 may generate an initial financial estimate to be included in the final claim assessment. In some implementations, calculation module 330 may simply add the component estimate and the labor estimate to determine the initial total financial estimate. Alternatively, calculation module 330 may adjust the sum total of the component and labor estimates to account for redundancies or other pricing adjustments. For example, component and supply costs estimates from component module 310 may be too high if the labor costs calculated by services module 320 include some or all of the necessary supplies needed to perform repairs. In this case, calculation module 330 may revise the sum total of the component and labor estimates downward accordingly.

Figure 4:
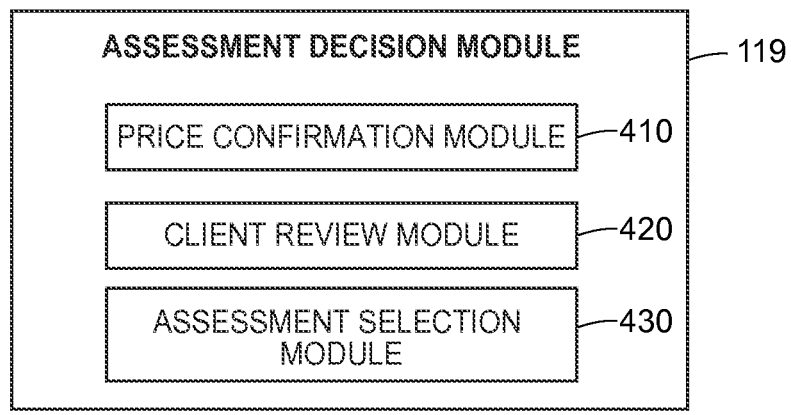
FIG. 4 depicts an assessment decision module according to the present disclosure.

FIG. 4 is a block diagram detailing an exemplary embodiment of the assessment decision module 119 according to the present disclosure. The assessment decision module 119 may include a price confirmation module 410, a client review module 420, and a assessment selection module 430. The price confirmation module 410, client review module 420, and assessment selection module 430 may be separate modules or may be combined and may interact with each other and/or with other software, firmware, and/or hardware.

Again, execution of claim assessment module 112 may cause the processor 102 to generate and/or request an initial financial estimate to be included in a final claim assessment, and financial estimate module 117 and comparison module 115 may be involved in this process as described above. After the generation of the initial final estimate, assessment decision module 119 may review and/or analyze this data and generate a final claim assessment. More specifically, assessment decision module 119 may verify and/or evaluate the initial estimate from financial estimate model 117 and may generate a final claim assessment that may be sent to an insurance agent for further processing or directly to a client.

Among other things, price confirmation module 410 may be used to verify and/or evaluate the financial estimate or estimates from financial estimate module 117. For example, price confirmation module 410 may compare the financial estimate or estimates from financial estimate module 117 with pre-stored data about financial costs of settling similar claims (e.g., other claims in a similar geographical area, claims comprising similar damage levels, previous claims from the same client etc.). More specifically, price confirmation module 410 may compare financial estimates generated by financial estimate module 117 with pre-stored financial data about other financial settlements. The pre-stored financial data may be stored, for example in a separate data structure and/or in database 150. Based on the results of the comparisons of the generated financial estimates with the pre-stored financial data, price confirmation module 410 may modify the estimate or estimates from financial module 117. When determining whether to modify these estimates, price confirmation module may optionally instruct financial estimate module 117 to generate a new set of price estimates if the difference between the previously generated estimate and a modified estimate is too large. If this is the case, price confirmation module 410 may perform another price comparison after the new set of price estimates has been generated.

Client review module 420 may be used to review data about the client/party that made the assessed claim. For example, for a claim related to a home owner's wind-damaged roof, the client review module 420 may review a file or files containing data about the home owner. The file or files may, for example, include data about previous claims made by the same owner, data about previous claims on the same property by other owners, previously known damage to or incidents on the property, etc. Reviewing this data may allow for early detection of potentially fraudulent claims. For example, if the claim being assessed is for roof damage to a client's home, and the review by client review module 420 indicates that a the home owner had recently made a claim and received compensation for alleged damage to the same roof, this may indicate that the new claim may be fraudulent. If a potentially fraudulent claim is detected, instead of generating a final financial assessment, client review module may generate a flagged message indicating that the claim needs further review by a party (e.g., an insurance agent). Alternatively, if it appears that the claim is legitimate (i.e., not fraudulent), client review module 420 may generate a message indicating that assessment selection module 430 should generate an assessment on the pending claim. Client review module 420 may also review the client's insurance policy to verify that the assessed damage is covered by the policy and/or to verify that any financial compensation is appropriate. For example, if a client only has $5,000 worth of coverage, but financial estimate module 117 estimated $10,000 in damage to the client's property, client review module 420 may ensure or confirm that the client only receives $5,000 in compensation.

Assessment selection module 430 may be used in conjunction with price confirmation module 410, and/or client review module 420 to determine the final claim assessment generated at the end of the assessment process. More specifically, after one or more financial estimates have been generated and a client review has been performed, assessment selection module 430 may communicate with claim assessment module 112 to generate and communicate a final claim assessment. The assessment may be sent directly to the client who made the assessed claim and/or it may be sent to an agent for further processing (e.g., manual claim assessment, filing related paperwork, review of the client's file, etc.). The generated claim assessment may include a variety of information. For example, if a client is due reimbursement, the assessment may include a listing of the reimbursement amount. The assessment may also include a listing of the assessed damage and/or information about the assessment process itself (e.g., date, time, location, etc.).

In some instances, a client may be deemed ineligible for a final claim assessment. In such instances, assessment selection module 430 may communicate with claim assessment module 112 to generate and communicate a notice that may be sent automatically to the client or to an agent stating that the user is not eligible for reimbursement at that time and/or that his claim requires further review.

Figure 5:
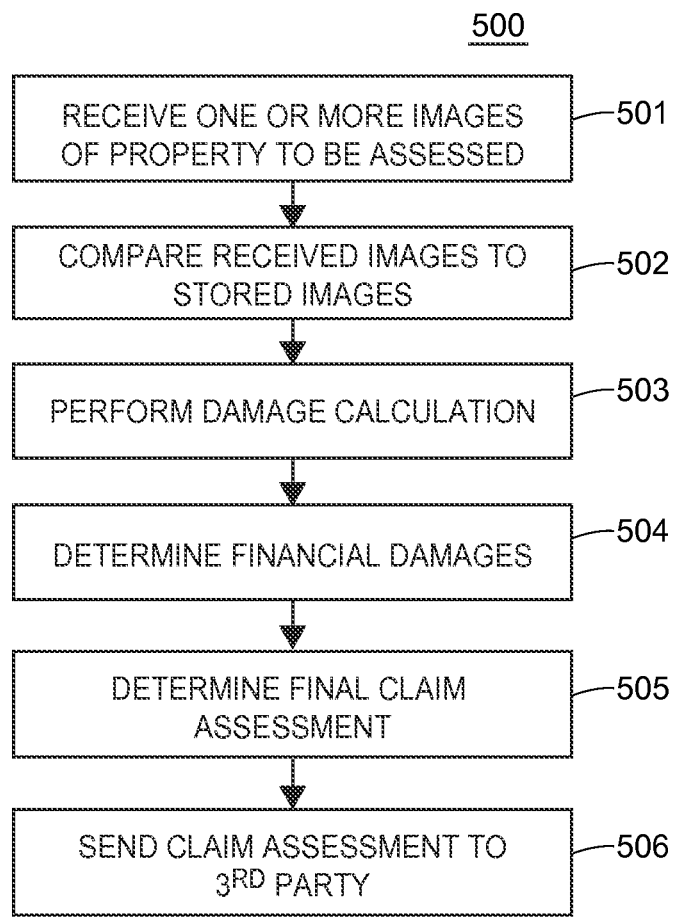
FIG. 5 depicts a flow diagram illustrating an exemplary method for automatically performing claim assessment according to the present disclosure.

FIG. 5 depicts a flow diagram illustrating an exemplary method for assessing a claim according to the present disclosure. While the method 500 is described with respect to a single device below, the method 500 may optionally be performed on multiple devices. For example, the claim assessment module 112 may be executed on a processor associated with a mobile device or on a processor associated with a server device, or may be executed partially on a processor associated with a client device and partially on a processor associated with a server device. Specifically, claim assessment module 112 may execute in a processor of a client device or another computing device to collect and analyze images of a claimed property and/or structure. The claim assessment module 112 may also execute in the processor of a server device, retrieving stored images and/or pricing information for transmission, in whole or in part, to a client or another computing device. Alternatively, calculations may be performed on a server/remote device while images and/or other reference data may be stored on a client or other computing device.

The method 500 begins when the claim assessment module 112 receives (e.g., by capturing then retrieving, by requesting and receiving, etc.), an image or images of property or objects to be assessed at a claim site (e.g., images of a damaged or destroyed roof) (block 501). the image or images may be stored locally on a device such as assessment device 101 or remotely on a server device.

After receiving the image or images, the claim assessment module 112 may compare the image or images to one or more stored images (block 502). More specifically, the claim assessment module 112 may use comparison module 115 to compares the captured image or images to at least one similar image. The similar image may be stored in an image database such as database 150. As described earlier, the image database may be stored locally on a device such as device 101 or remotely and may contain images of property and materials similar to those that were damaged or destroyed. For example, for a claim related to a home owner's wind-damaged roof, the comparison module 115 may compare captured images of the roof to images of an intact roof and/or of intact individual roof tiles/shingles.

Based on the comparison results, claim assessment module 112 may perform a damage calculation (block 503). More specifically, if the claim being assessed is for damage to a client's roof, the comparison module 115 may compare a captured image of the damaged roof to the image of the intact roof, and based on the comparison, may calculate the relative amount of damage. For example, damage may be confined to only the upper right corner or center of a roof. Alternatively, the entire roof may be damaged, or damage may be limited to only a few roof tiles/shingles. Based on the comparisons and the relative amount of damage, the comparison module may calculate the appropriate remedy. For example, if damage is concentrated in a small area of a roof, only that portion of the roof may need to be replaced. Alternatively, if the entire roof is damaged or damage is spread across the roof, the entire roof may need to be replaced.

The claim assessment module 112 may then determine financial damages (block 504). More specifically, claim assessment module 112 may use financial estimate module 117 to evaluate calculations by the comparison module 115 and calculate financial damages accordingly. More specifically, claim assessment module 112 may evaluate the remedy calculated by the comparison module 115 (e.g., replace only a section of a roof, replace the entire roof, replace only a few roof tiles, etc.) and calculate the financial cost of the remedy. The claim assessment module 112 may refer to a financial database that may be stored locally or remotely and may contain pricing estimates of property and materials similar to those that were damaged or destroyed. As discussed above, the financial database may also list geographically appropriate labor costs that may be used by the claim assessment module 112 when calculating financial damages. If more than one repair option is available (e.g., it would be possible to either replace the entire roof or replace only a section of the roof, depending on client preferences), claim assessment module 112 may calculate the financial cost for both options.

The claim assessment module 112 may also determine a final claim assessment at the end of the assessment process (block 505). More specifically, after one or more financial estimates have been generated and a client review has been performed, assessment selection module 430 may interact with claim assessment module 112 to generate and communicate a final claim assessment. The assessment may be sent directly to the client who made the assessed claim and/or it may be sent to an agent for further processing (e.g., manual claim assessment, filing related paperwork, review of the client's file, etc.). The generated claim assessment may include a variety of information. For example, if a client is due reimbursement, the assessment may include a listing of the reimbursement amount. The assessment may also include a listing of the assessed damage and/or information about the assessment process itself (e.g., date, time, location, etc.). As discussed above, if a client is deemed ineligible for a final claim assessment, claim assessment module 112 may generate and communicate a notice that may be sent automatically to the client or to the insurance agent stating that the user is not eligible for reimbursement at that time and/or that his claim requires further review.

The claim assessment module 112 may optionally send the generated claim assessment to a third party (e.g., an insurance agent or a client that originally filed the claim) (block 506). For example, if further review of the assessment is required before it is sent to a client, claim assessment module 112 may send the generated claim to an insurance agent for review and/or approval. The agent may, for example, review financial calculations, manually review the captured images, review the client's claim history, or any other relevant information that might affect the claim assessment. In certain circumstances, the automatically generated assessment may need to be adjusted (e.g., the claim assessment module 112 based its financial estimates on outdated pricing data), and the insurance agent can adjust the assessment before the assessment is sent to the client. The insurance agent may also be required to physically or electronically sign and/or approve any assessments that are transferred to him before the assessments are sent to clients.

In certain implementations, the presented assessment may be automatically enforceable and may not require further agent review before being sent to the client. In these implementations, the insurance agent may be required to review reference data (e.g., pricing data, reference images, etc.).

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA), etc.). A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automated claim assessment through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system configured to automatically assess a claim, the system comprising:
    a controllable inspection vehicle including an image sensor, the controllable inspection vehicle controlled via a transportation module configured to cause the controllable inspection vehicle to travel around a geographic area; and
    a device including:
        an input unit;
        a processing unit;
        a memory unit; and
        a claim assessment module configured to cause the device to:
            receive one or more captured images of an identified building, the one or more captured images captured, via the image sensor, from one or more locations traversed by the controllable inspection vehicle;
            automatically perform an analysis of the one or more captured images, including:
                (i) automatically perform a comparison between the one or more captured images and one or more reference images;
                (ii) automatically calculate, based on results of the image comparison, damage to the identified building, including identifying parts for repair or replacement; and
                (iii) automatically estimate a remedial financial cost to remedy the damage calculated from the image comparison; perform a fraud analysis of past events relevant to the claim, wherein the past events occurred prior to the device receiving the one or more captured images; and
            generate a claim assessment based, at least in part, on (i) results of the analysis of the one or more captured images, the results of the analysis including the estimated remedial financial cost and (ii) results from the fraud analysis.

2. The system of claim 1, wherein the claim assessment module is further configured to:
    transmit the claim assessment to an agent for further processing.

3. The system of claim 1, wherein the claim assessment module is further configured to:
    cause the image sensor to capture the one or more captured images.

4. The system of claim 1, wherein the claim assessment denies financial compensation.

5. The system of claim 1, wherein the claim assessment is an insurance claim assessment.

6. The system of claim 1 wherein the transportation module is configured to cause the controllable inspection vehicle to travel around the geographic area by implementing at least one of:
    autonomous control of the controllable inspection vehicle; or
    radio control of the controllable inspection vehicle based on received radio signals.

7. A non-transitory computer-readable storage medium comprising instructions executable by one or more processors to cause one or more processors to:
    receive via the one or more processors one or more captured images of an identified building or vehicle, the one or more captured images having been captured via an image sensor carried by a controllable inspection vehicle while the controllable inspection vehicle traversed a geographic area;
    automatically perform an analysis of the one or more captured images, including:
        (i) automatically perform via the one or more processors a comparison between the one or more captured images and one or more reference images;
        (ii) automatically calculate, based on results of the image comparison and via the one or more processors damage to the identified building or vehicle, including identifying parts for repair or replacement; and
        (iii) automatically estimate, via the one or more processors, a remedial financial cost to remedy the damage calculated from the image comparison;
    perform a fraud analysis of past events relevant to the claim, the past events having occurred prior to receiving the one or more captured images; and
    generate via the one or more processors a claim assessment based, at least in part, on (i) results of the analysis of the one or more captured images, the results of the analysis including the estimated remedial financial cost, and (ii) results from the fraud analysis.

8. The non-transitory computer-readable storage medium of claim 7, further comprising instructions to cause the one or more processors to:
    transmit the claim assessment to an agent for further processing.

9. The non-transitory computer-readable storage medium of claim 7, further comprising instructions to cause the one or more processors to:
    cause the image sensor carried by the controllable inspection vehicle to capture the one or more captured images.

10. The non-transitory computer-readable storage medium of claim 7, wherein the claim assessment denies financial compensation.

11. The non-transitory computer-readable storage medium of claim 7, wherein the claim assessment is an insurance claim assessment.

12. The non-transitory computer-readable storage medium of claim 7, wherein the instructions further comprise:
    instructions to implement control of the controllable inspection vehicle.

13. A method, implemented at a computing device having a processor, of automatically assessing a claim, the method comprising:
    automatically receiving, using the processor, one or more captured images of an identified building or vehicle, the one or more captured images having been captured via an image sensor carried by a controllable inspection vehicle while the controllable inspection vehicle traversed a geographic area;
    automatically performing an analysis of the one or more captured images, including:
        (i) automatically performing, using the processor, a comparison between the one or more captured images and one or more reference images;
        (ii) automatically calculating, using the processor and based on results of the image comparison, damage to the identified building or vehicle, said automatically calculating including identifying parts for repair or replacement; and
        (iii) automatically estimating, using the processor, a remedial financial cost to remedy the damage calculated from the image comparison;
    automatically performing a fraud analysis of past events relevant to the claim, wherein the past events having occurred prior to receiving the one or more captured images; and
    automatically generating, using the processor, a claim assessment based, at least in part, on (i) results of the analysis of the one or more captured images, including the estimated remedial financial cost, and (ii) results from the fraud analysis.

14. The method of claim 13, further comprising:
    automatically transmitting, using the processor, the claim assessment to an agent for further processing.

15. The method of claim 13, further comprising:
    automatically causing, using the processor, the image sensor carried by the controllable inspection vehicle to capture the one or more captured images.

16. The method of claim 13, wherein the claim assessment denies financial compensation.

17. The method of claim 13, wherein the claim assessment is an insurance claim assessment.

18. The method of claim 13, further comprising:
    implementing control of the controllable inspection vehicle.

* * * * *